2,860,085

PROCESS FOR PREPARING PHOSPHORIC ESTERS OF SUBSTITUTED UMBELLIPHERONE, AND PESTICIDAL COMPOSITIONS OBTAINED THEREBY

Raffaello Fusco, Giuseppe Losco, and Cesare Augusto Peri, Milan, Italy, assignors to Montecatini Societa Generale per l'Industria Mineraria e Chimica No Drawing. Application April 10, 1956
Serial No. 577,204

Claims priority, application Italy April 14, 1955

9 Claims. (Cl. 167—33)

This invention relates to a process for preparing phosphoric esters of substituted umbellipherone and pesticidal compositions obtained thereby.

Dialkoxythiophosphoric esters of hydroxy-coumarin and various derivatives thereof have been prepared in the past by means of a procedure used in preparing dialkylthiophosphoric acid, but adding powdered metallic copper.

Compounds obtained in the afore-said manner which are known to possess insecticidal power comprise 7 hydroxy-coumarin (umbellipherone) derivatives, characterized by alkyl substituents in the 4-position and halogens in the 3-position of the umbellipherone.

We now made the unexpected discovery that the introduction of a closed ring methylene chain between the 3- and 4-positions of umbellipherone would result in compounds of particularly high insecticidal activity coupled with a low toxicity toward warm-blooded animals.

Accordingly, it is one object of the present invention to provide a new class of esters of thiophosphoric acids, having the general formula

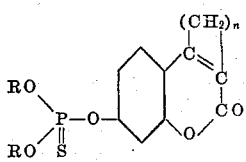

wherein R represents a lower alkyl and $n$ represents the integers 3 and 4. In other words the substitution of the umbellipherone with a straight or branched chain saturated hydrocarbon forms, together with the carbons in the 3- and 4-position, a penta- or hexa-atomic ring.

It is another object of the invention to provide methods of preparing these compounds.

More particularly, this class of new compounds consists of dialkylthiophosphoric esters of 3-4-trimethylene-umbellipherone or of 3-4-tetramethylene-umbellipherone, if desired with alkyl substituents in the methylene chain.

We found that these compounds display extremely interesting insecticidal properties which makes them particularly useful in the control of the housefly, including those strains of the housefly that have become resistant to the usual chlorinated insecticides.

Of the herein disclosed compounds, the O,O-diethyl-thiophosphoric ester of 3-4-tetramethylene-umbellipherone has attained particular importance because of its physico-chemical properties which make it highly persistent, say, on walls treated therewith, and because of its extremely low toxicity toward warm-blooded animals (as will appear further below, in connection with experiments carried out with mice).

The herein claimed products are obtained by reacting an O,O-dialkylthiophosphoric acid halide of the general formula

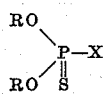

wherein R represents a lower alkyl and X represents a halogen (chlorine, bromine or iodine) with a heterocyclic phenolic compound of the general formula

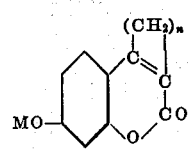

wherein $n$ represents the integers 3 and 4, so that the bivalent methylene chain deriving from a straight or branched chain saturated hydrocarbon forms, with the carbon in the 3- and 4-position, a penta- or hexa-atomic ring, and M represents an alkali metal (sodium or potassium).

The reaction is carried out in a solvent for one or both of the reactants, at a temperature between 10° and 150° C. An alternative method consists in using the heterocyclic phenol as such instead of the alkaline salt thereof, together with a basic compound that is sufficiently alkaline to bind the hydro-halogenic acid that is formed. Useful for this purpose are sodium- or potassium-hydrate, -carbonate, -methylate or -ethylate, etc.

After removal of the reaction byproducts, the desired compounds are obtained as solids, which may be purified, if desired, by crystallization from suitable organic solvents.

The compounds of this invention may be employed in a number of ways. They may be suitably diluted or extended by mixing with liquid, semisolid or solid carriers (to form a dough with the semisolid carrier); whereby various wetting, adhesive, dispersing and emulsifying agents may be added according to principles generally known in the art.

Moreover, these substances may be dispersed in the air by fumigation or in form of aerosols. Other insecticidal materials, such as dichloro-diphenyltrichloroethane, the gamma isomer of hexachloro-cyclohexane, octachloro-4,7-methanetetrahydroindane as well as other phosphoric and triophosphoric esters, or fungicidal compounds, such as copper sulfate, dithiocarbamates, thiocyanates, and pyrethrum extracts as well as synthetic pyrethrine, may be associated therewith.

The following examples are presented to illustrate the invention, without intention, however, of limiting thereby the scope of the appended claims.

EXAMPLE 1

20.2 gr. of finely powdered 3-4-trimethylene-unbellipherone, followed by 16.1 gr. of O,O-dimethyl-thiophosphoric acid chloride are added to a solution of 2.3 gr. of metallic sodium in 100 cc. of methyl alcohol. The mixture is stirred for 3 hours at 15–20° C., whereupon 200 cc. of water and 100 cc. of a 4% aqueous caustic soda solution are added. A solid substance separates, that is filtered and thoroughly washed with water. It is crystallized from a warm mixture of benzene-petroleum ether (1:1).

14.2 gr. of needle-like crystals are obtained, having a

M. P. of 88–89° C. The analysis agrees with the formula

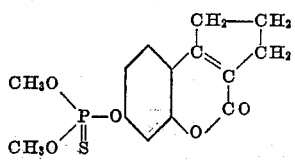

EXAMPLE 2

20.2 gr. of 3-4-trimethylene-umbellipherone are added to a solution of 2.3 gr. of sodium in 100 cc. of ethyl alcohol, followed by 18.9 gr. of O,O-diethyl-thiophosphoric acid chloride. Upon operating as set forth in Example 1, 14 gr. of needle-like crystals are obtained, having a M. P. of 85–86° C. The product consists of the O,O-diethyl-thiophosphoric ester of 3-4-trimethylene-umbellipherone.

EXAMPLE 3

24 gr. of finely powdered sodium salt of 3-4-tetramethylene-umbellipherone are added to a solution of 21.7 gr. of O,O-diisopropyl-thiophosphoric acid chloride in 100 cc. of acetone. The mixture is refluxed for 3 hours and, after cooling, poured into 400 cc. of water. 400 cc. of 4% NaOH are added while vigorously stirring, and 35 gr. of a solid substance are obtained, that is crystallized from boiling methyl alcohol. The product consists of the O,O-diisopropyl-thiophosphoric ester of 3-4-tetramethylene-umbellipherone, which forms needle-like crystals having a M. P. of 112–114° C.

EXAMPLE 4

108 gr. of 3-4-tetramethylene-umbellipherone and 95 gr. of diethyl-thiophosphoric acid chloride are added to a solution of 11.5 gr. of metallic sodium in 750 cc. of methyl alcohol. The mixture is refluxed for half an hour, and poured into 2 liters of water, while stirring. The solid product is filtered off and thoroughly washed with water. After drying, it is treated with 300 cc. of petroleum ether. 113 gr. of a crystalline substance are obtained, having a M. P. of 84–86° C. After subsequent crystallization from a benzene-petroleum ether mixture (1:1), colorless needles are obtained, having a M. P. of 86–88° C. The analysis agrees with the formula

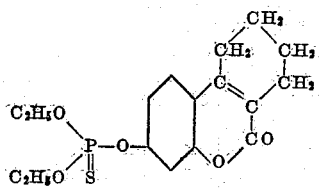

If the alkaline reaction mother-liquor is acidified with HCl, 33 gr. of unchanged tetramethylene-umbellipherone are recovered.

EXAMPLE 5

23.8 gr. of finely powdered 3-4-tetramethylene-umbellipherone and 10 gr. of finely powdered anhydrous potassium carbonate are added to 100 cc. of acetone. The mixture is stirred at room temperature for one and one half hours, whereupon 19 gr. of the O,O-diethyl-thiophosphoric acid chloride are added to the mixture, which is then refluxed for 3 hours. After cooling, 400 cc. of water and 100 cc. of 4% NaOH are added. The product (36 gr.) collected on a filter, and crystallized from benzene-petroleum ether, melts at 86–88° C. It represents the O,O-diethyl-thiophosphoric ester of 3-4-tetramethylene-umbellipherone (see formula of Example 4).

EXAMPLE 6

21.6 gr. of 3-4-trimethylene-umbellipherone are added to a solution of 2.3 gr. of metallic sodium in 100 cc. of methyl alcohol. The mixture is stirred for 15 minutes and, at a temperature of 20° C., 16.1 gr. of O,O-dimethyl-thiophosphoric acid chloride are added. The mixture is stirred for an additional half an hour at 20° C., whereupon 300 cc. of ice water and 100 cc. of a 4% aqueous solution of sodium hydrate are added. The solid product is filtered off and washed first with water and then with petroleum ether. 22 gr. of a material are obtained, having a M. P. of 95–97° C. When crystallized from a benzene-petroleum ether mixture colorless needles are obtained, melting at 99–100° C., and consisting of the O,O-dimethyl-thiophosphoric ether of 3-4-tetramethylene-umbellipherone.

*Evaluation of the biological activity of the compounds described in the foregoing examples*

EXAMPLE 7.—HOUSE FLY

The following mean percent mortalities have been obtained after 20 hours, by topic application, with a microsyringe, of an acetonic solution of the test products, on house flies 5 days old.

| γ/fly | 50 | 10 | 2 | 0.4 |
|---|---|---|---|---|
| | Percent mortality after 20 hours | | | |
| O,O-dimethyl-thiophosphoric ester of 3-4-trimethylene-umbellipherone | 100 | 92 | 59 | 12 |
| O,O-diethyl-thiophosphoric ester of 3,4-trimethylene-umbellipherone | 100 | 100 | 100 | 85 |
| O,O-diisopropyl-thiophosphoric ester of 3,4-tetramethylene-umbellipherone | | 36 | 0 | 0 |
| O,O-diethyl-thiophosphoric ester of 3,4-tetramethylene-umbellipherone | 100 | 100 | 100 | 87 |
| O,O-dimethyl-thiophosphoric ester of 3,4-tetramethylene-umbellipherone | 86 | 59 | 15 | 0 |

Through tharsal absorption, by introducing female flies 5 days old in beakers previously treated with checked amounts of benzenic solutions of the active test substances, and leaving the flies for 20 hours in contact with the material, the following mortalities have been ascertained:

| | gr./mq. | Percent mortality after 20 hours |
|---|---|---|
| O,O-dimethyl-thiophosphoric ester of 3,4-trimethylene-umbellipherone | 0.025 | 28 |
| | 0.125 | 100 |
| O,O-diethyl-thiophosphoric ester of 3,4-trimethylene-umbellipherone | 0.005 | 29 |
| | 0.025 | 97 |
| O,O-diethyl-thiophosphoric ester of 3,4-tetramethylene-umbellipherone | 0.005 | 53 |
| | 0.025 | 90 |
| | 0.125 | 100 |

EXAMPLE 8.—APHIS FABAE

By spraying a population of female, Aptera, virginoparous aphids on bean plants, in standard conditions, with an aqueous dispersion of conveniently formulated test substances, the following mean mortalities have been obtained after 24 hours:

| | Conc. percent act. subst. | Percent mort. after 24 hours |
|---|---|---|
| O,O-dimethyl-thiophosphoric ester of 3,4-trimethylene-umbellipherone | 0.1 | 2 |
| | 0.5 | 15 |
| O,O-diethyl-thiophosphoric ester of 3,4-trimethylene-umbellipherone | 0.1 | 4 |
| | 0.5 | 60 |
| O,O-diisopropyl-thiophosphoric ester of 3,4-tetramethylene-umbellipherone | 0.1 | 2 |
| O,O-diethyl-thiophosphoric ester of 3,4-tetramethylene-umbellipherone | 0.5 | 25 |
| O,O-dimethyl-thiophosphoric ester of 3,4-tetramethylene-umbellipherone | 0.5 | 10 |

EXAMPLE 9.—TETRANYCHUS TELARIUS

By spraying a mixed acarus population, in different stages of development, on bean plants in standard conditions, with an aqueous dispersion of the test substances, conveniently formulated, the following mean mortalities have been obtained after 24 hours:

|  | conc. act. subst. | Percent mort. after 24 hours |
|---|---|---|
| O,O-dimethyl-thiophosphoric ester of 3, 4-trimethylene-umbellipherone | 0.5 | 70 |
| O,O-diethyl-thiophosphoric ester of 3, 4-trimethylene-umbellipherone | 0.5 | 60 |
| O,O-diisopropyl-thiophosphoric ester of 3, 4-tetramethylene-umbellipherone | 0.1 | 5 |
| O,O-diethyl-thiophosphoric ester of 3, 4-tetramethylene-umbellipherone | 0.5 | 15 |
| O,O-dimethyl-thiophosphoric ester of 3, 4-tetramethylene-umbellipherone | 0.5 | 15 |

*Acute oral toxicity determination of some of the herein disclosed compounds*

EXAMPLE 10

The acute oral toxicity has been determined by gastric probing and administration of a solution of the products in dimethylacetamide to small white mice weighing 18/20 gr. Solvent interference was found to be negligible as far as toxic manifestations are concerned.

| | LD 50, mg./kg. |
|---|---|
| Parathion (as standard) | 8.2 |
| O,O-diethyl-thiophosphoric ester of 3,4-trimethylene-umbellipherone | 64.57 |
| O,O-diethyl-thiophosphoric ester of 3,4-tetramethylene-umbellipherone | [1] 450.0 |

[1] Cause only 30–40% mortality of the treated animals.

We claim:
1. The method of preparing thiophosphoric esters of the general formula

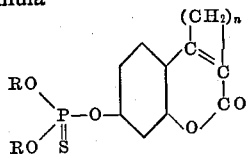

wherein R represents a lower alkyl and $n$ represents the integers 3 and 4, said method comprising introducing the finely powdered halide of an O,O-dialkylthiophosphoric acid of the general formula

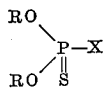

wherein X is a halogen taken from the group consisting of chlorine, bromine and iodine, and a heterocyclic phenolic compound of the general formula

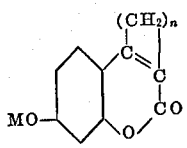

wherein M represents sodium and potassium, into a solvent for at least one of said compounds, reacting said compounds at a temperature ranging from 10° to 150° C., adding an excess of water and separating and washing precipitated solids.

2. The method of preparing thiophosphoric esters of the general formula

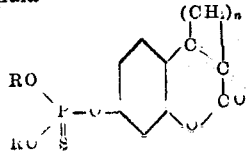

wherein R represents a lower alkyl and $n$ represents the integers 3 and 4, said method comprising introducing the finely powdered halide of an O,O-dialkylthiophosphoric aicd of the general formula

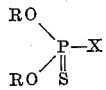

wherein X is a halogen taken from the group consisting of chlorine, bromine and iodine, and a heterocyclic phenolic compound of the general formula

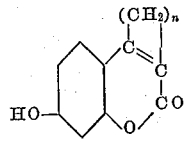

into a solvent for at least one of said compounds, said solvent containing a basic compound that is sufficiently alkaline to bind hydrohalogenic acid set free during the reaction, reacting said compounds at a temperature ranging from 10° to 150° C., adding an excess of water and separating and washing precipitated solids.

3. As pesticidal compounds, members of the group consisting of phosphoric esters of substituted unbellipherone having the general formula

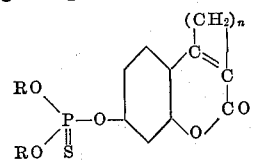

wherein R represents a lower alkyl and $n$ represents the integers 3 and 4.

4. The O,O-dimethyl-thiophosphoric ester of 3,4-trimethylene-umbellipherone.

5. The O,O-diethyl-thiophosphoric ester of 3-4-trimethylene-umbellipherone.

6. The O,O-diisopropyl-thiophosphoric ester of 3-4-tetramethylene-umbellipherone.

7. The O,O-dimethyl-thiophosphoric ester of 3-4-tetramethylene-umbellipherone.

8. The O,O-diethyl-thiophosphoric ester of 3-4-tetramethylene-umbellipherone.

9. A fly-killing composition consisting of the O,O-diethyl-thiophosphoric ester of 3,4-tetramethylene-umbellipherone as one of the active components and a member taken from the group of insecticidal compounds consisting of dichloro-diphenyltrichloroethane, the gamma isomer of hexachloro-cyclohexane, octachloro-4,7-methanetetrahydroindane, copper sulfate, dithiocarbamate, thiocyanate, pyrethrum extract and synthetic pyrethrine, as another active component.

References Cited in the file of this patent

UNITED STATES PATENTS 2,624,745    Schrader _____ Jan. 6, 1953

OTHER REFERENCES

Hoffman et al.: Chemical Abstracts, vol. 48 (1954), p. 11, 711.